United States Patent
Lee et al.

(10) Patent No.: US 6,822,871 B2
(45) Date of Patent: Nov. 23, 2004

(54) SLIDING-TYPE PORTABLE WIRELESS TERMINAL

(75) Inventors: Jae-Gab Lee, Kumi-shi (KR); Jong-Gun Bae, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 35 days.

(21) Appl. No.: 10/379,551

(22) Filed: Mar. 6, 2003

(65) Prior Publication Data

US 2004/0085739 A1 May 6, 2004

(30) Foreign Application Priority Data

Nov. 19, 2002 (KR) .................................. 10-2002-71911

(51) Int. Cl.$^7$ ................................................ H05K 5/03
(52) U.S. Cl. .................... 361/727; 361/679; 379/433.01
(58) Field of Search ................................ 361/679–681; 379/428.01, 433.01, 433.12, 440

(56) References Cited

U.S. PATENT DOCUMENTS

| | | | | |
|---|---|---|---|---|
| 5,173,936 A | * | 12/1992 | Ditzig et al. | 379/440 |
| 5,440,629 A | * | 8/1995 | Gray | 379/433.12 |
| 5,485,517 A | * | 1/1996 | Gray | 379/433.13 |
| 6,208,874 B1 | * | 3/2001 | Rudisill et al. | 455/575.4 |
| 6,249,672 B1 | | 6/2001 | Castiel | 455/90 |
| 6,339,699 B1 | * | 1/2002 | Hirai et al. | 455/575.1 |

FOREIGN PATENT DOCUMENTS

| | | | |
|---|---|---|---|
| DE | 29814228 | 1/1999 | H04M/1/00 |
| EP | 0580334 | 1/1994 | H04M/1/02 |
| EP | 0944219 | 9/1999 | H04M/1/02 |
| EP | 1150476 | 10/2001 | H04M/1/02 |

OTHER PUBLICATIONS

Gronroos et al. (US 2001/0036266 A1), "Telescopic Structure for a Telephone Apparatus", Nov. 1, 2001.*

* cited by examiner

*Primary Examiner*—Yean-Hsi Chang
(74) *Attorney, Agent, or Firm*—Roylance, Abrams, Berdo & Goodman, L.L.P.

(57) ABSTRACT

A sliding-type portable wireless terminal that has a main body, and a sub body that longitudinally slides on the main body to open from and close into the main body. The sliding-type portable wireless terminal comprises a spring module that is fixed to the main body and includes torsion springs for supplying a sliding force in a direction of closing the sub body into the main body when the sub body is downwardly slid on the main body by a designated distance in the direction of closing the sub body into the main body, and supplying a sliding force in a direction of opening the sub body from the main body when the sub body is upwardly slid on the main body by the designated distance in the direction of opening the sub body from the main body. The sliding-type portable wireless terminal uses the torsion springs as means for sliding the sub body on the main body, thereby ensuring a smooth sliding motion of the sub body. In addition, the sliding-type portable wireless terminal use the torsion springs having a small height, thereby manufacturing the spring module with a slim size and being advantageous in terms of the miniaturization of the terminal.

15 Claims, 7 Drawing Sheets

SLIDING-TYPE PORTABLE WIRELESS TERMINAL

PRIORITY

This application claims priority under 35 U.S.C. § 119 to an application entitled "SLIDING-TYPE PORTABLE WIRELESS TERMINAL", filed in the Korean Industrial Property Office on Nov. 19, 2002 and assigned Serial No. 2002-71911, the contents of which are incorporated herein by reference.

BACKGROUND OF THE INVENTION

1. Field of the Invention

The present invention relates to a portable wireless terminal, and more particularly to a sliding-type portable wireless terminal in which a sub body slides on a main body in a longitudinal direction to expose and cover a keypad of the main body of the wireless terminal.

2. Description of the Related Art

Portable wireless terminals are divided into several categories, i.e., bar-type terminals, flip-type terminals, and folder-type terminals.

In the case of the bar-type terminal, data inputs and outputs and transmitting and receiving units, are installed on a main housing. A keypad, which serves as a means for inputting data, is always exposed. For example, if a user stores the bar-type terminal in a pocketbook or pocket, keys on the keypad may be unintentionally depressed resulting in false calls, high cost and possible embarrassment to the user. Furthermore, since the bar-type terminal requires a sufficient distance between the transmitting unit and the receiving unit, the bar-type terminal is therefore limited in the degree to which it can be miniaturized.

The flip-type terminal comprises a main body, a flip, and a hinge module for connecting the flip to the main body. Data inputs and outputs and transmitting and receiving units, are installed on the main body. The flip covers a keypad, which is for inputting data. The keypad is installed on the main body of the flip-type terminal. When a caller places a call on the wireless terminal, the flip is in an open position to expose the keypad for a caller to dial a phone number. When the flip-type terminal is stored, for example, in a pocketbook or pocket, the flip covers the keypad and prevents operation of the keypad. This prevents unintentional operation of the keypad. However, the flip-type terminal is also limited in the degree to which it can be miniaturized due to a requirement that there be a sufficient distance between the transmitting unit and the receiving unit.

The folder-type terminal comprises a main body, a folder, and a hinge module for rotatably connecting the folder to the main body. The folder is rotated about a hinge axis of the hinge module and is opened from and closed into the main body. In a standby mode of operation, when the folder is closed into the main body, the unintentional operation of the keypad is prevented since the folder covers the keypad. In a communication mode of operation, when the folder is opened from the main body, a sufficient distance between a transmitting unit and a receiving unit exists. Therefore, the folder-type terminal is advantageous in terms of its ability to be miniaturized. For this reason, users typically prefer the folder-type terminal.

In the flip-type terminal or the folder-type terminal, when the flip or the folder is rotated from the main body at more than a designated angle via the hinge module that rotatably connects the flip or the folder to the main body, a force acting in a direction of opening the flip or the folder from the main body is applied to the flip or the folder. On the other hand, when the flip or the folder is rotated from the main body at less than the designated angle via the hinge module, a force acting in a direction of closing the flip or the folder into the main body is applied to the flip or the folder.

Recently, in accordance with the diversification of designs of portable wireless terminals, a sliding-type portable wireless terminal in which a sub body slides on a main body to expose and cover a keypad installed on the main body has been developed recently and is increasingly being used.

However, the sliding-type portable wireless terminal is limited in terms of its possible structures and must be manually operated by users so as to allow the sub body to fully slide on the main body of the wireless terminal.

SUMMARY OF THE INVENTION

Therefore, it is an object of the present invention to provide a sliding-type portable wireless terminal in which a sub body is easily slid onto a main body and is opened from and closed into the main body.

These and other objects of the present invention can be substantially accomplished a sliding-type portable wireless terminal that has a main body, and a sub body that longitudinally slides on the main body to open from and close into the main body. The sliding-type portable wireless terminal comprises a spring module that is fixed to the main body and includes torsion springs for supplying a sliding force in a direction of closing the sub body into the main body when the sub body is downwardly slid on the main body by a designated distance in the direction of closing the sub body into the main body, and supplying a sliding force in a direction of opening the sub body from the main body when the sub body is upwardly slid on the main body by the designated distance in the direction of opening the sub body from the main body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
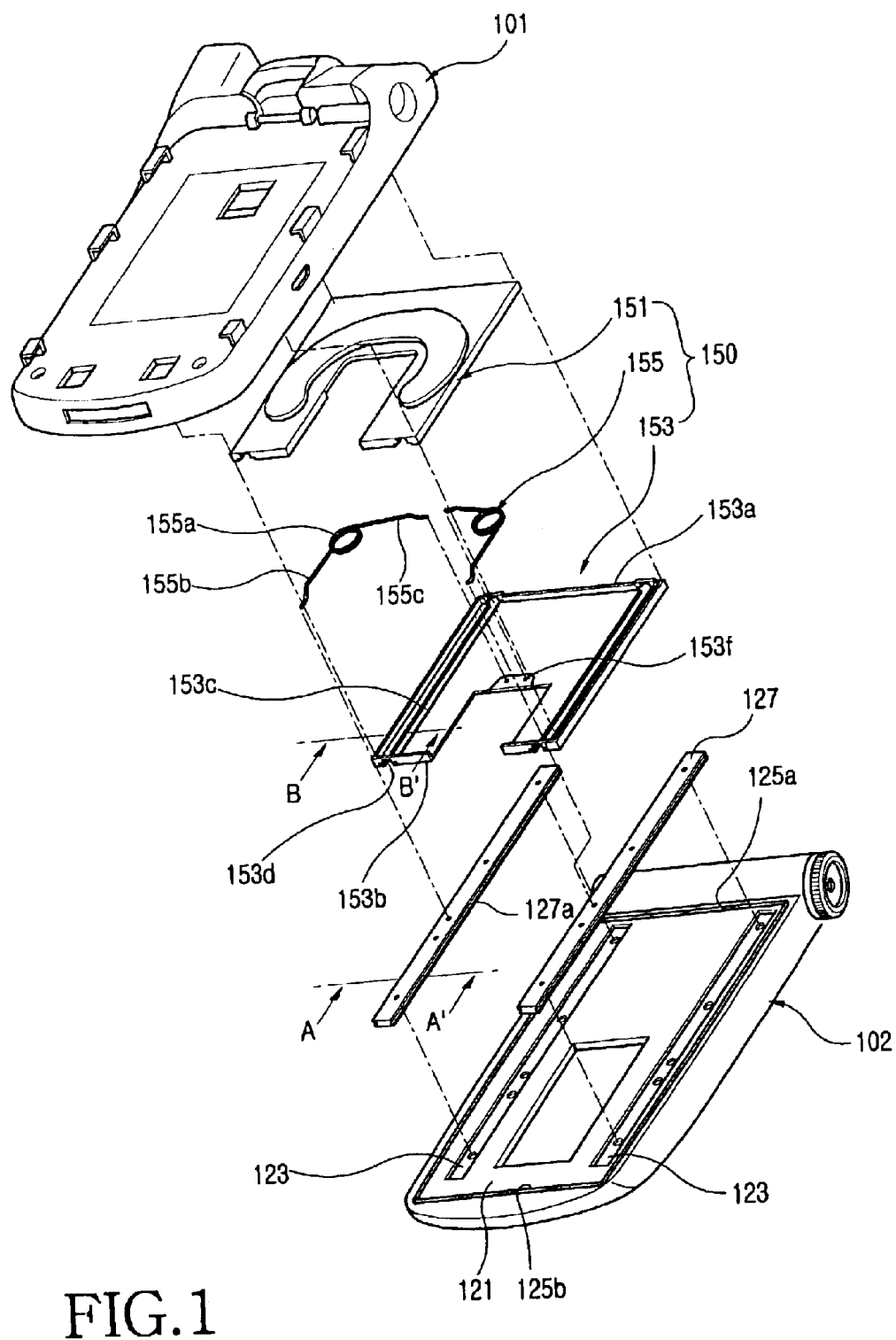
FIG. 1 is an exploded perspective view of an example of a sliding-type portable wireless terminal in accordance with an embodiment of the present invention.

Several embodiments of the present invention will now be described in detail with reference to the accompanying drawings. In the drawings, the same or similar elements are denoted by the same reference numerals even though they are depicted in different drawings. Also, a detailed description of known functions and configurations have been omitted for conciseness.

FIG. 1 is an exploded perspective view of an example of a sliding-type portable wireless terminal 100 in accordance with an embodiment of the present invention. As shown in FIG. 1, the sliding-type portable wireless terminal 100 in accordance with an embodiment of the present invention comprises a main body 101, a sub body 102, and a spring module 150 for connecting the sub body 102 to the main body 101 to enable the sub body 102 to slide on the main body 101.

Figure 8:
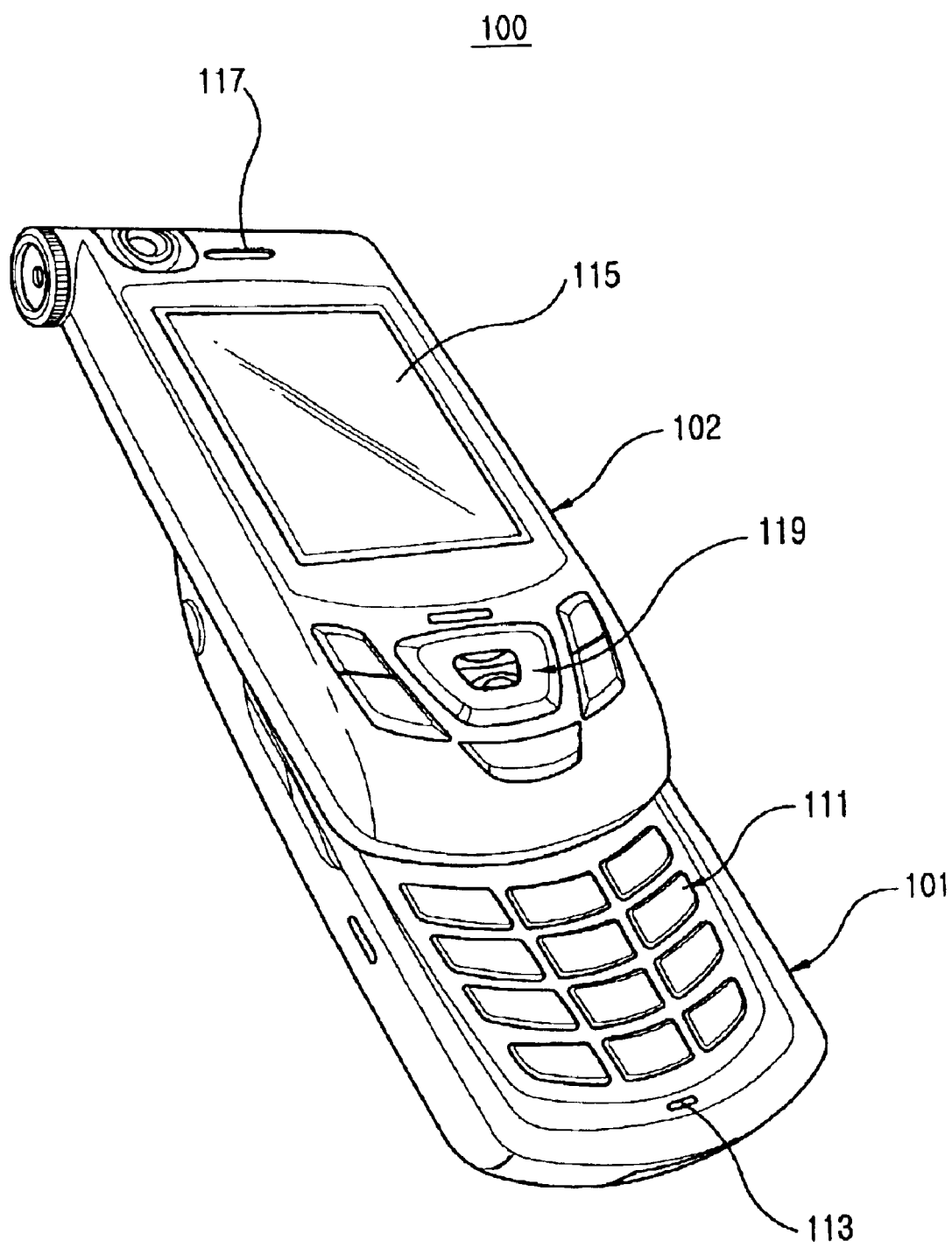
FIG. 8 is a perspective view of the portable wireless terminal of FIG. 6 when the sub body is fully opened from the main body.

Reference will now be made to FIG. 8 which is a perspective view of the portable wireless terminal 100 of FIG. 6 when the sub body 102 is fully opened from the main body 101. A keypad 111 and a transmitting unit 113 having a microphone (not shown) installed therein are provided on a front surface of the main body 101. The sub body 102 slides longitudinally on the main body 101, thereby exposing and covering the keypad 111 and the transmitting unit 113 on the main body 101.

Figure 3A:
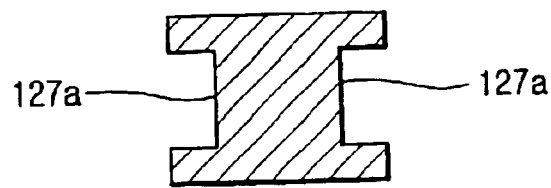
FIG. 3a is a cross-sectional view of a sliding guide taken along the line A–A' of FIG. 1.

The sub body 102 is connected to the main body 101 to enable the sub body 102 to slide on the main body 101, and a receiving unit 117 having a speaker (not shown) installed therein, a display device 115 such as a LCD (liquid crystal display), a TFT (thin film transistor), and the like, and function keys 119 are provided on a front surface of the sub body 102. Referring to FIG. 1, a pair of sliding guides 127 are installed on a rear surface of the sub body 102, thereby ensuring a smooth sliding motion of the sub body 102 on the main body 101. Preferably, as shown in FIG. 3a, the sliding guide 127 has an H-beam shape including side slits 127a longitudinally formed on both side surfaces of the sliding guide 127. The H-beam shaped sliding guides 127 guide the sliding motion of the sub body 102 on the main body 101, and simultaneously prevent the sub body 102 from being separated from the main body 101. In order to open and close the sub body 102 from and into the main body 101, the sub body 102 should preferably slide longitudinally on the main body 101. The sliding guides 127 are fixed to connection grooves 123 longitudinally formed on the rear surface of the sub body 102 as shown in FIG. 1.

The spring module 150 includes a rear cover 151, a front cover 153, and torsion springs 155.

Figure 2:
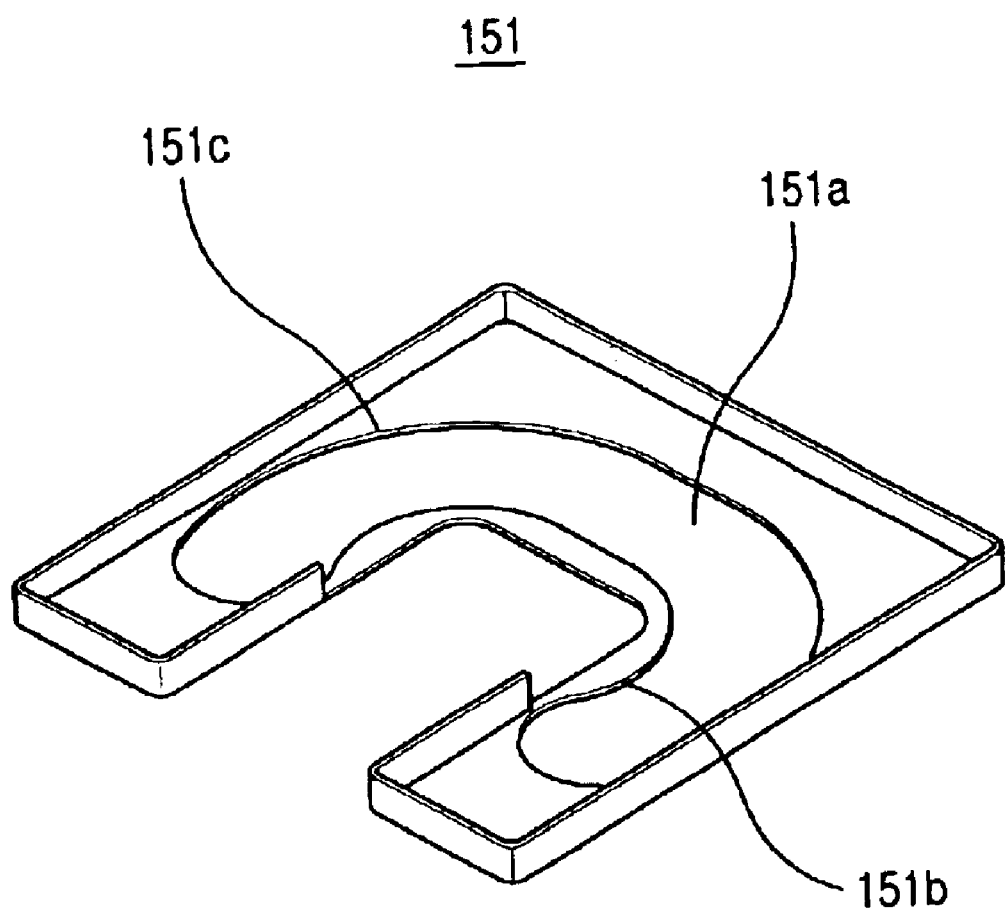
FIG. 2 is a perspective view of an inner surface of a rear cover of a spring module of FIG. 1.

The rear cover 151 is fixed to the front surface of the main body 101. In an embodiment of the invention, the rear cover 151 can be formed separately from the main body 101. In another embodiment of the invention, the rear cover 151 can be formed integrally with the main body 101. The rear cover 151 is disposed beyond an upper portion of the front surface of the main body 101, and the keypad 111 is formed on a lower portion of the front surface of the main body 101. As shown in FIG. 2, a C-shaped or substantially C-shaped recess 151a is formed on the rear cover 151, thereby serving as a space for allowing the torsion springs 155 to move therein. The recess 151a includes an inner side wall 151b and an outer side wall 151c.

Figure 3B:
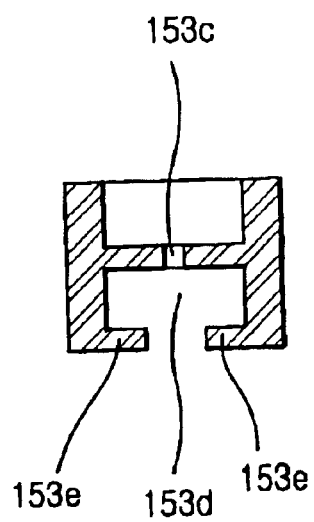
FIG. 3b is a cross-sectional view of a front cover taken along the line B–B' of FIG. 1.

Referring to FIG. 1, sliding grooves 153d are longitudinally formed on the front cover 153 to correspond to the sliding guides 127. A guide slit 153c is longitudinally formed through the bottom surface of the sliding groove 153d of the front cover 153. As shown in FIG. 3b, sliders 153e formed on both sides of the open end of the sliding groove 153d move within the side slits 127a of the sliding guide 127 depicted in FIG. 1. The upper surfaces of the sliding guides 127 are connected to the inside of the front cover 153 via the guide slits 153c. Supporting holes 153f for supporting the torsion springs 155 are formed through the front cover 153. The front cover 153 is fixed to the rear cover 151 and is simultaneously connected to the sliding guides 127 on the rear surface of the sub body 102, thereby serving as a bridge for connecting the sub body 102 to the main body 101 to enable the sub body 102 to slide on the main body 101.

The torsion spring 155 includes a coil 155a, a first fixing terminal 155b extends from one end of the coil 155a, and a second fixing terminal 155c extends from the other end of the coil 155a. The coil 155a of the torsion spring 155 moves along a designated path within the recess 151a of the rear cover 151. The first fixing terminal 155b protrudes through via the guide slit 153c of the front cover 153. The first fixing terminal 155b is fixed to the sliding guide 127 that is on the rear surface of the sub body 102, and the second fixing terminal 155c is fixed to the supporting hole 153f of the front cover 153. An elastic force that moves the first fixing terminal 155b and the second fixing terminal 155c away from each other is stored in the torsion springs 155. The cumulative elastic force provides sufficient force to enable the sub body 102 to slide on the main body 101 to expose and cover the keypad 111 and the transmitting unit 113 installed on the main body 101. The torsion spring 155 preferably has a thin thickness, thereby producing a slim-sized spring module 150 to slide the sub body 102 on the main body 101.

Figure 4:
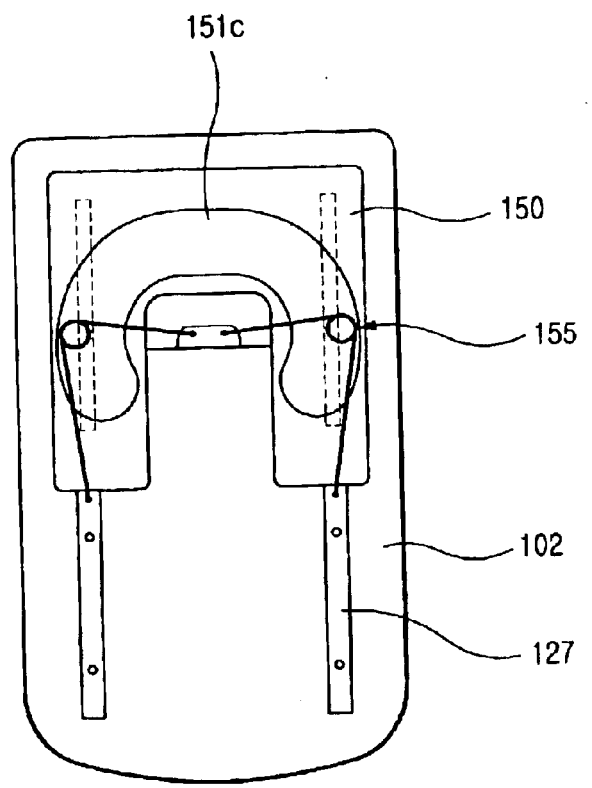
FIG. 4 is a top plan view showing an example of an operation of a torsion spring in a closed condition of a sub body into a main body of the portable wireless terminal of FIG. 1.
Figure 5:
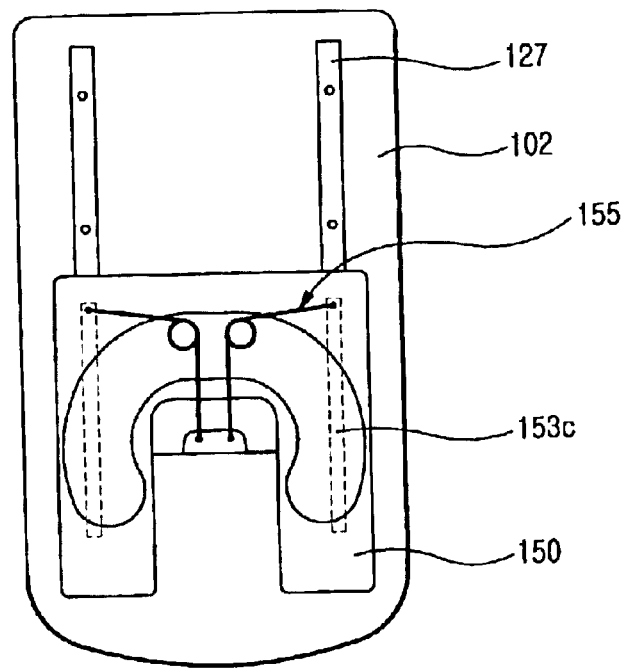
FIG. 5 is a top plan view showing an example of an operation of the torsion spring in an opened condition of the sub body from the main body of the portable wireless terminal of FIG. 1.

FIGS. 4 and 5 illustrate an operation of the torsion springs 155. FIG. 4 shows the sub body 102 being closed into the main body 101, thereby covering the keypad 111 and the transmitting unit 113 on the main body 101. Herein, the first fixing terminals 155b of the torsion springs 155 pass through the guide slits 153c.

First, the sub body 102 is closed into the main body 101 in the sliding-type portable wireless terminal 100. When a user longitudinally slides the sub body 102 upwards on the main body 101 in a direction of opening the sub body 102 from the main body 101, the first fixing terminals 155b and the second fixing terminals 155c are positioned closer to each other, and an elastic force is stored in the torsion springs 155. Then, after the sub body 102 is longitudinally slid further upwardly on the main body 101 and passes a point at which the first fixing terminals 155b and the second fixing terminals 155c are closest to each other, although the user does not continue to slide the sub body 102 further on the main body 101, the first fixing terminals 155b and the second fixing terminals 155c are moved away from each other by the elastic force stored in the torsion springs 155. That is, after the user moves the sub body 102 so as to upwardly slide the sub body 102 on the main body 101 by a designated distance, the sub body 102 is automatically opened from the main body 101 without any force applied by the user to expose the keypad 111 and the transmitting unit 113 on the main body 101.

The following describes an example of an operation of closing the sliding-type portable wireless terminal in a state in which the sub body 102 is opened from the main body 101. After the sub body 102 is longitudinally slid on the main body 101 downwardly in a direction of closing the sub body 102 into the main body 101 and passes the point at which the first fixing terminals 155b and the second fixing terminals 155c are closest to each other, although the user does not continue to slide the sub body 102 further downwardly on the main body 101, the sub body 102 is closed into the main body 101 by the elastic force stored in the torsion spring 155 to cover the keypad 111 and the transmitting unit 113 on the main body 101.

Hereinafter, a change in the elastic force stored in the torsion springs 155 during opening and closing the sub body 102 from and into, respectively, the main body 101 will be described in detail. In case the sub body 102 is fully opened from and fully closed into the main body 101, the elastic force stored in the torsion springs 155 has its minimum value. When the first fixing terminal 155b and the second fixing terminal 155c are closest to each other during opening and closing the sub body 102 from and into, respectively, the main body 101, the elastic force stored in the torsion spring 155 has its maximum value.

As a result, after the sub body 102 slides on the main body 101 and passes the point where the first fixing terminals 155b and the second fixing terminals 155c are closest to each other, the sub body 102 continues to slide on the main body 101 in the same direction, thereby being opened from or closed into the main body 101 by means of the elastic force of the torsion springs 155. That is, when the sub body 102 slides on the main body 101 less than a designated distance, a force acting in a direction of closing the sub body 102 into the main body 101 is applied to the torsion springs 155. On the other hand, when the sub body 102 slides on the main body 101 more than the designated distance, a force acting in a direction of opening the sub body 102 from the main body 101 is applied to the torsion springs 155. This results in a semi-automatic sliding operation of the sub body 102 relative to the main body 101.

The coil 155a of the torsion spring 155 moves along a designated curved path within the recess 151a. Herein, an obstacle (not shown) such as a rib for limiting the curved movement of the coil 155a within the recess 151a can be installed in the rear cover 151, thereby limiting the range of the sliding movement of the sub body 102 on the main body 101. By limiting the movement of the coil 155a, any impact generated in the process of opening and closing the sub body 102 from and into, respectively, the main body 101 is partially absorbed by the torsion springs 155.

A cavity 121 for receiving the spring module 150 and supplying a space for the movement of the spring module 150 is formed on the rear surface of the sub body 102. Side walls 125a and 125b are respectively formed on upper and lower ends of the cavity 121 to respectively contact upper and lower ends 153a and 153b of the spring module 150. That is, when the sub body 102 is closed into the main body 101, the side wall 125a of the cavity 121 contacts the upper end 153a of the spring module 150. When the sub body 102 is opened from the main body 101, the side wall 125b of the cavity 121 contacts the lower end 153b of the spring module 150. Therefore, the range of the sliding movement of the sub body 102 is limited by the spring module 150.

As described above, by limiting the movement of the coil 155a, any impact generated between the side wall 125b of the cavity 121 and the lower end 153b of the spring module 150 in the process of opening the sub body 102 from the main body 101 is absorbed by the torsion springs 155. Furthermore, in order to assure the reliability of the components of the sliding-type portable wireless terminals, an additional shock absorber (not shown) such as a damper made of rubber can be formed on a directly impacted position in the sliding-type portable wireless terminal according to an embodiment of the present invention.

Figure 6:
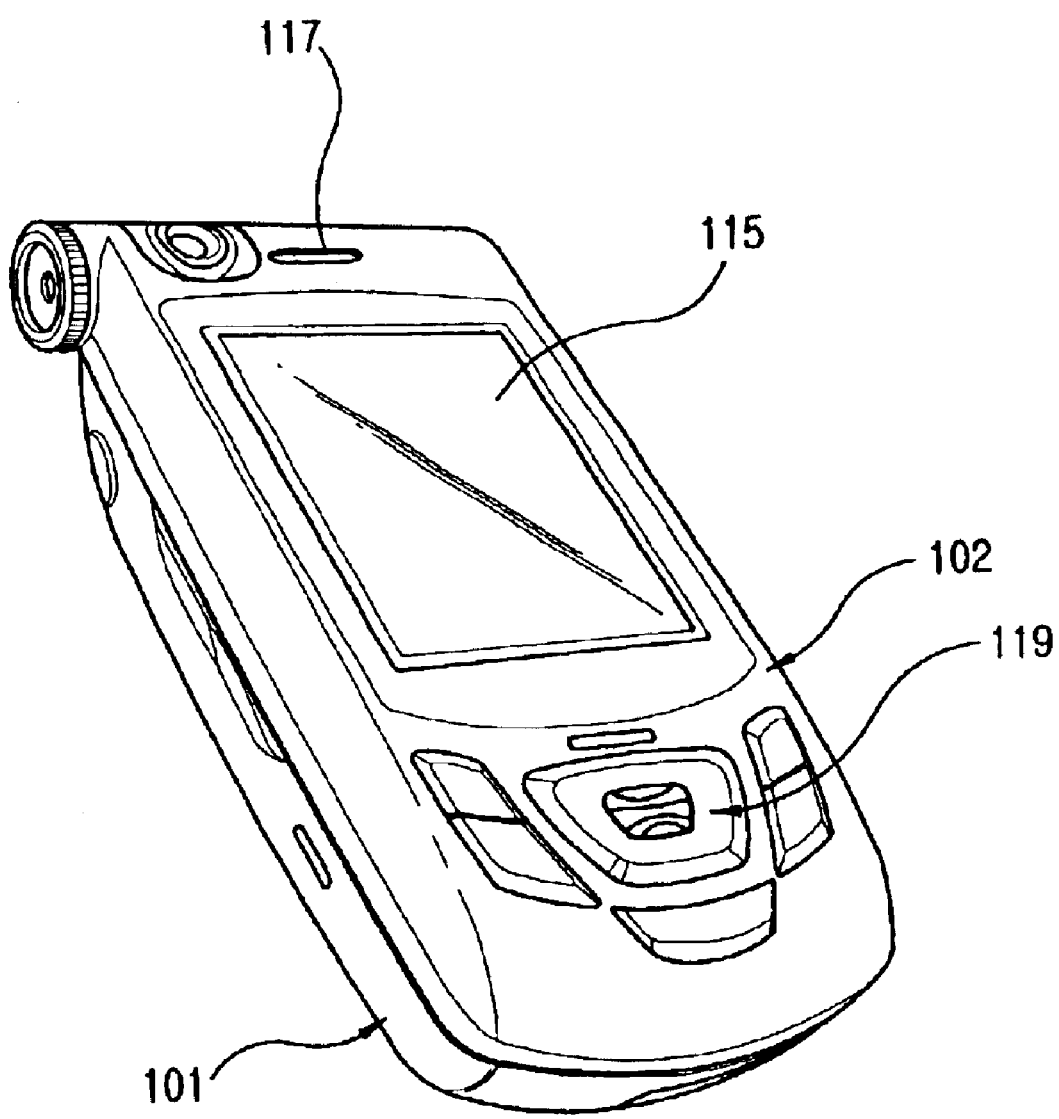
FIG. 6 is a perspective view of the assembled portable wireless terminal of FIG. 1.
Figure 7:
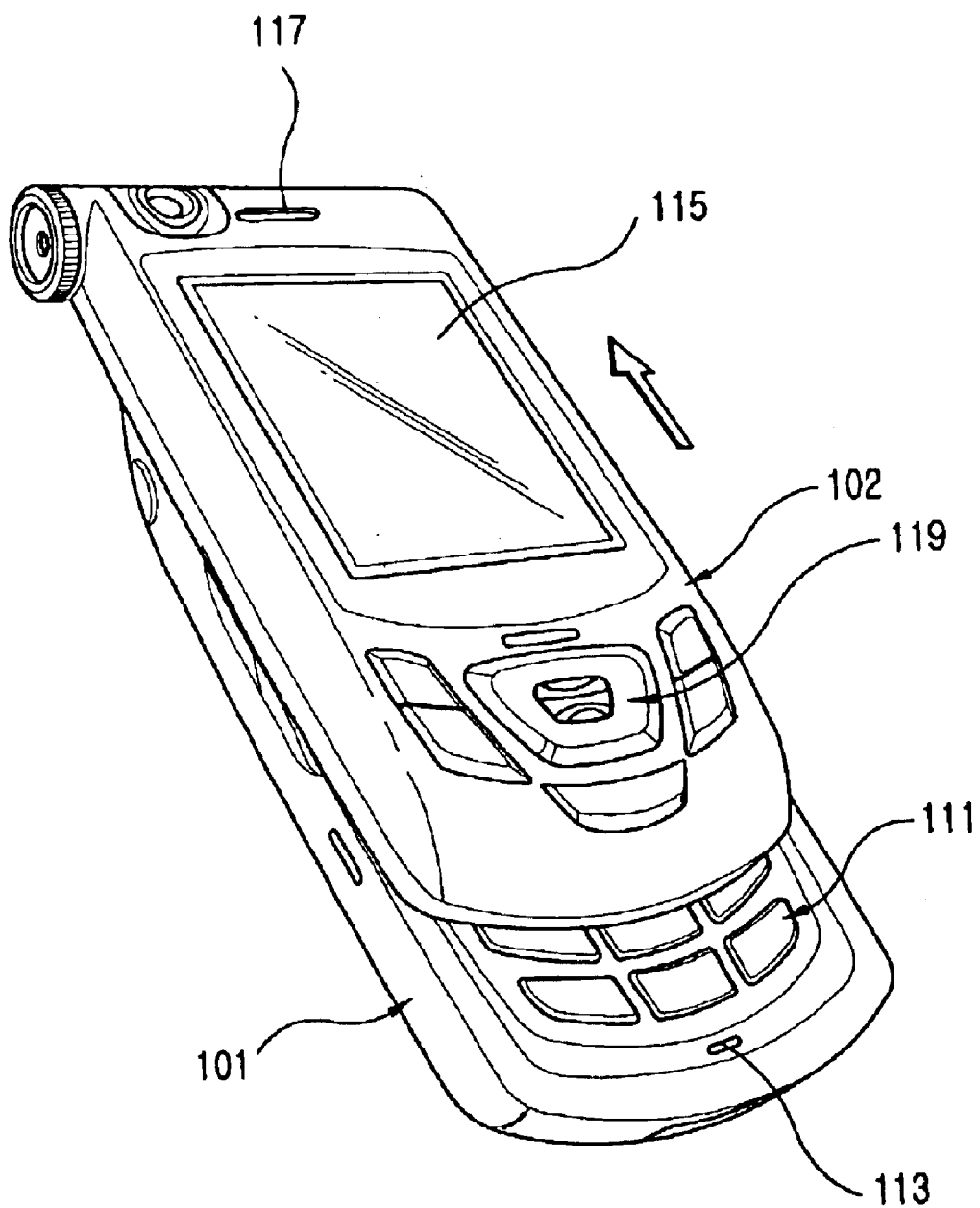
FIG. 7 is a perspective view of the portable wireless terminal of FIG. 6 when the sub body is being opened from the main body.

As described briefly above, FIG. 6 is an assembled perspective view of the portable wireless terminal 100 of FIG. 1. FIG. 7 is a perspective view of the portable wireless terminal of 100 of FIG. 6, while the sub body 102 is being opened from the main body 101 so as to expose the keypad 111 and the transmitting unit 113 on the main body 101, and FIG. 8 is a perspective view of the portable wireless terminal 100 of FIG. 6, when the sub body 102 is fully opened from the main body 101. As shown in FIGS. 6 to 8, the receiving unit 117 having the speaker installed therein, the display device 115, and the function keys 119 are provided on the front surface of the sub body 102. The keypad 111 and the transmitting unit 113 having the microphone installed therein are provided on the front surface of the main body 101 of the terminal 100. The sub body 102 slides on the main body 101 and is opened from and closed into the main body 101 to expose and cover the keypad 111 and the transmitting unit 113 on the main body 101. The opening and closing of the sub body 102 is performed by the spring module 150 via the torsion springs 155.

As apparent from the above description, the embodiments of the present invention described above provide a sliding-type portable wireless terminal using torsion springs as a means for sliding a sub body on a main body, thereby ensuring a smooth sliding motion of the sub body. Further, the embodiments of the present invention reduce a height of the torsion spring, thereby manufacturing a spring module with a slim size and that is advantageous in terms of the miniaturization of the terminal.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sliding-type portable wireless terminal having a main body, and a sub body adapted to longitudinally slide on the main body to open from and close into the main body, the sliding-type portable wireless terminal, comprising:
   a spring module being fixed to the main body and including torsion springs adapted to supply a sliding force in a direction of closing the sub body into the main body when the sub body is downwardly slid on the main body by a designated distance in the direction of closing the sub body into the main body, and to supply a sliding force in a direction of opening the sub body from the main body when the sub body is upwardly slid on the main body by a designated distance in the direction of opening the sub body from the main body.

2. The sliding-type portable wireless terminal as set forth in claim 1, wherein the spring module comprises:
   said torsion springs, each having a coil, and a first fixing terminal extending from one end of the coil, and a second fixing terminal extending from the other end of the coil;
   a rear cover being fixed to the main body, and having a recess for supplying a space for moving each of the coils of said torsion springs and supporting holes for supporting ends of the second fixing terminals; and
   a front cover connected to the sub body and being longitudinally slid on the sub body, and simultaneously being fixedly connected to the rear cover so as to protect the torsion springs, said front cover having guide slits extending in a longitudinal direction to expose the first fixing terminals of the torsion springs to the outside.

3. The sliding-type portable wireless terminal as set forth in claim 2, wherein the rear cover is formed integrally with the main body.

4. The sliding-type portable wireless terminal as set forth in claim 2, wherein the torsion springs comprise a pair of torsion springs, said pair of torsion springs being symmetrical to each other.

5. The sliding-type portable wireless terminal as set forth in claim 4, wherein the pair of torsion springs are located within the rear cover.

6. The sliding-type portable wireless terminal as set forth in claim 2, wherein sliding guides are formed on a rear surface of the sub body.

7. The sliding-type portable wireless terminal as set forth in claim 6, wherein sliding slits are longitudinally formed on the outer surface of the front cover of said main body to correspond to the sliding guides.

8. The sliding-type portable wireless terminal as set forth in claim 6, wherein the sliding guides are substantially H-beam shaped.

9. The sliding-type portable wireless terminal as set forth in claim 6, wherein the sliding guides are adapted to guide a motion of the sub body.

10. The sliding-type portable wireless terminal as set forth in claim 6, wherein the sliding guides are adapted to prevent the sub body from being separated from the main body.

11. The sliding-type portable wireless terminal as set forth in claim 2, wherein the first fixing terminal that passes through the guide slit of the front cover is fixed to a designated position of the sliding guide.

12. The sliding-type portable wireless terminal as set forth in claim 2, wherein the recess is substantially C-shaped.

13. The sliding-type portable wireless terminal as set forth in claim 2, wherein said torsion springs are adapted to have a thin thickness.

14. The sliding-type portable wireless terminal as set forth in claim 1, wherein said sliding-type portable wireless terminal is adapted to be miniaturized.

15. The sliding-type portable wireless terminal as set forth in claim 1, wherein the rear cover of the sliding-type portable wireless terminal is adapted to be formed separately from the main body of the sliding type portable wireless terminal.

* * * * *